United States Patent [19]
Adams et al.

[11] Patent Number: 5,649,043
[45] Date of Patent: Jul. 15, 1997

[54] OPTICAL FIBER CABLE HAVING TRUNCATED TRIANGULAR PROFILE TUBES

[75] Inventors: Michael L. Adams, Hickory, N.C.; David A. Keller, St. Christophe, France; Jörgen Påborn, Sexdrega, Sweden

[73] Assignee: Alcatel NA Cable Systems, Inc., Claremont, N.C.

[21] Appl. No.: 506,542

[22] Filed: Jul. 25, 1995

[51] Int. Cl.⁶ ............................................. G02B 6/44
[52] U.S. Cl. .................. 385/110; 385/66; 385/84; 385/112
[58] Field of Search ............................ 385/66, 84, 109, 385/110, 112, 113

[56] References Cited

U.S. PATENT DOCUMENTS

| | | | |
|---|---|---|---|
| 4,038,489 | 7/1977 | Stenson et al. | 174/70 R |
| 4,416,508 | 11/1983 | Dey et al. | 350/96.23 |
| 4,696,541 | 9/1987 | Haag et al. | 350/96.23 |
| 4,707,074 | 11/1987 | Heywood | 350/96.23 |
| 4,786,137 | 11/1988 | Cornelison et al. | 350/96.23 |
| 4,895,427 | 1/1990 | Kraft | 350/96.23 |
| 4,906,067 | 3/1990 | Mayr et al. | 350/96.23 |
| 4,915,490 | 4/1990 | Ramsay et al. | 350/96.23 |
| 5,210,813 | 5/1993 | Oestreich et al. | 385/105 |
| 5,212,756 | 5/1993 | Eoll | 385/114 |
| 5,229,851 | 7/1993 | Rahman | 385/114 |
| 5,310,510 | 5/1994 | Pascher | 264/1.5 |

Primary Examiner—Rodney B. Bovernick
Assistant Examiner—Robert E. Wise
Attorney, Agent, or Firm—Ware, Fressola, Van Der Sluys & Adolphson LLP

[57] ABSTRACT

An optical fiber cable includes a central strength member 11 surrounded by a plurality of optical fiber containing tubes 20, the central strength member and tubes being encircled by a sheath 35. The optical fiber containing tubes have a generally frustum or truncated isosceles triangular shaped profile with the base 22 of the triangular shape having a curvature corresponding to the inside surface of the cable sheath and a top 24 (truncated edge or corner) of the triangle opposite and generally parallel to the base having a curvature corresponding to the outside diameter of the central strength member, the plurality of tubes being positioned adjacent to one another in a pie shape to thereby form a central channel within the cable for the central strength member. The truncated isosceles triangular shape of the tubes have a larger cross-sectional area within the tubes for carrying optical fiber cables. Additionally, the shape of the tubes provides improved resistance to compression of the cable. Also, for a given number of optical fibers contained within the cable, the present invention provides an improved strain window as compared to prior art optical cables.

18 Claims, 4 Drawing Sheets

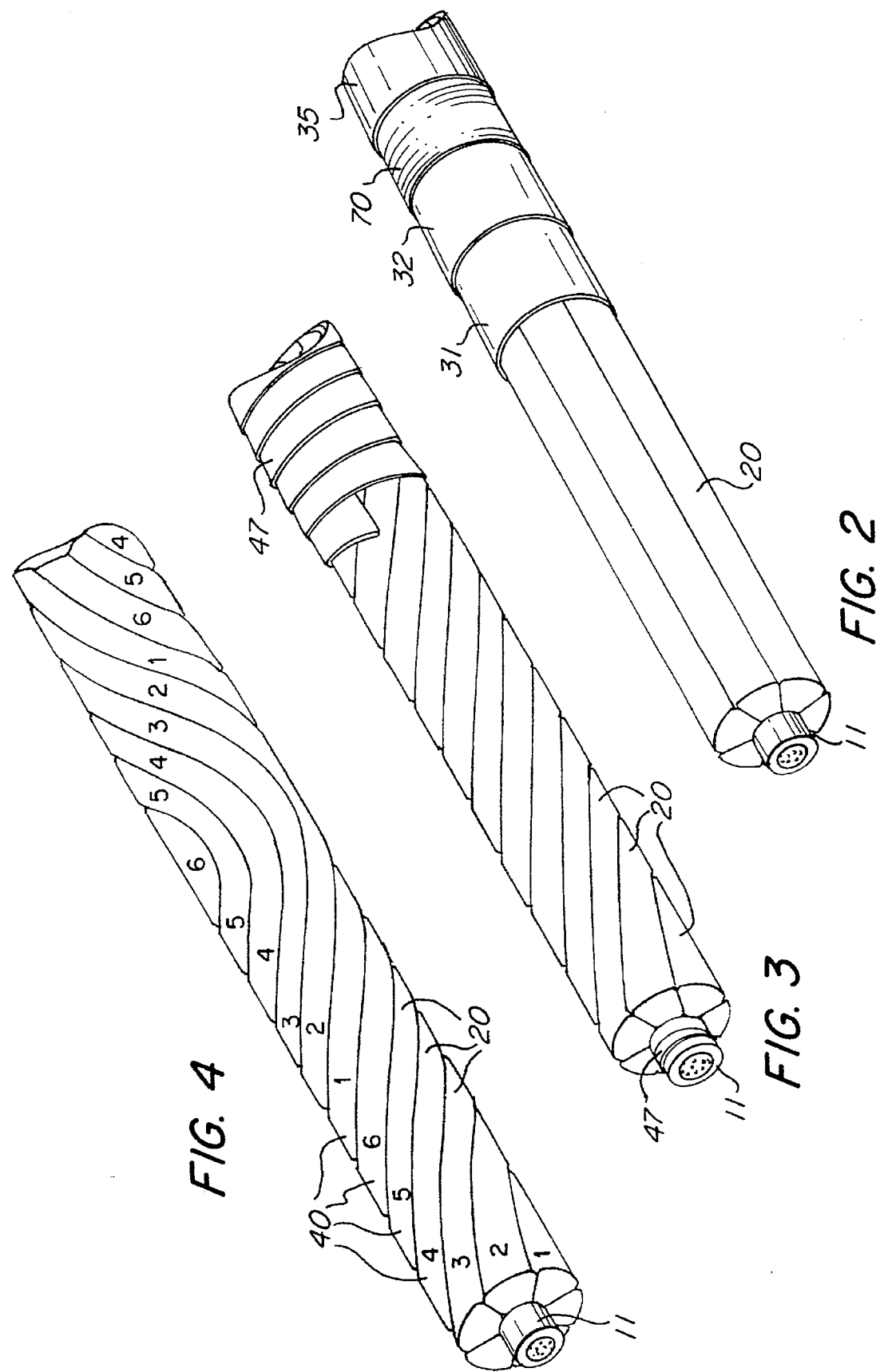

5,649,043

OPTICAL FIBER CABLE HAVING TRUNCATED TRIANGULAR PROFILE TUBES

TECHNICAL FIELD

The present invention relates to optical fiber cables, and more particularly, to an optical fiber cable having a high fiber density, reduced cable diameter, improved strain window, and improved compressive strength.

DESCRIPTION OF THE PRIOR ART

Optical fiber cables containing a plurality of optical fibers for the transmission of optical signals are well known. Such optical fiber cables typically include a core having a strength member to carry the axial tensile stress and axial compressive forces on the cable. Also located within the core are one or more tubes. Each tube typically includes a plurality of optical fibers. The optical fibers within a tube may be individually stranded or may be provided in an optical fiber ribbon. A sheath is provided to enclose the core including the tubes and the strength member.

It is also well known to use a water blocking material within the optical fiber cable to prevent the lengthwise ingress of water. For example, the cable may include a thixotropic gel within the tubes and/or between the tubes as a water blocking material. Alternatively, a dry water blocking material, such as a water absorbing tape, may be included within the cable to block the ingress of water.

It is known to provide the individual fibers or ribbons loosely within the tubes to thereby minimize the stress and strain on the fibers during bending of the optical fiber cable. As is known in the art, when the individual optical fibers or ribbons are received "loosely" in the tubes, they have an excess length such that the length of the fibers or ribbons is greater than the length of the tubes. Additionally, if the cable is provided with a central strength member, the tubes may be stranded about the central strength member. It is known to strand the tubes about the central strength member in helical fashion or alternatively in an alternating hand helix (SZ) type pattern where the helical stranding direction of the tubes reverses in a periodic fashion. Various armoring and strength elements may be provided between the central strength member and the tubes and/or between the tubes and the outer sheath.

In the manufacture of an optical fiber cable, it is highly desirable to provide a cable having a high optical fiber density or count, i.e., a cable having a large number of optical fibers which are provided for the transmission of optical signals. To achieve a high optical fiber density, cable have been developed with a "slotted core" design, wherein the individual tubes are eliminated, and the surface of the central strength member is slotted. The individual optical fibers or fiber ribbons are received in the slots and are held in place by various types of tapes, fibers or yarns. This design allows an increased fiber density because the area within the cable occupied by the tubes is now available for the optical fibers. However, using the above described slotted core design provides the significant disadvantage of exposing all of the optical fibers within the cable if the cable jacket is opened for any reason, such as for making a splice with some of the optical fibers contained therein.

Another important feature of an optical fiber cable is to provide the cable with a small or reduced cross-section or diameter to ease the installation of the cable, particularly in tight spaces. It is therefore desirable to provide an optical fiber cable of small cross-section having a high fiber density.

It is also very important to maintain the protection of the fibers from stress and strain due to bending, from tensile stress, and also from axial and radial compressive forces. Of course, it is also important to provide such an optical fiber cable of reduced cross-section, high fiber density, and adequate protection of the fibers which is cost effective to manufacturer.

SUMMARY OF THE INVENTION

Objects of the invention include the provision of an optical fiber cable having a high fiber density as compared to prior art optical fiber cables while providing adequate protection for the optical fibers contained therein against stress, strain and compressive forces.

Another object of the present invention is to provide such an optical fiber cable having improved resistance to compressive forces, and an improved strain window.

A still further object of the present invention is to provide such an optical fiber cable wherein the integrity of individual optical fiber containing tubes within the cable is maintained when a section of the cable jacket is removed for the purpose of gaining access to some of the optical fibers contained within one or more of the tubes within the cable.

According to the present invention, an optical fiber cable includes a central strength member surrounded by a plurality of optical fiber containing tubes, the central strength member and tubes being encircled by a sheath. The optical fiber containing tubes have a generally frustum or truncated isosceles triangular shaped profile with the base of the triangular shape having a curvature corresponding to the inside surface of the cable sheath and a truncated edge or corner of the triangle opposite and generally parallel to the base having a curvature corresponding to the outside diameter of the central strength member, the plurality of tubes being positioned adjacent to one another in a pie shape to thereby form a central channel within the cable for the central strength member.

In further accord with the present invention, the tubes may carry either individual optical fibers or optical fiber ribbons. The individual fibers or optical fiber ribbons may be loosely received in the tubes where the length of the optical fibers may be greater than the length of the tubes. Alternatively, the length of the individual fiber or optical fiber ribbons may be equal to or less than the length of the tubes.

In further accord with the present invention, the tubes may be positioned parallel to one another in an extended axial direction of the cable, or alternatively, the tubes may be stranded about the central strength member in a helical or alternating helical (SZ) pattern. A thixotropic flooding compound may be received within the tubes and/or between the tubes to provide protection against the ingress of water. Alternatively, after assembly of the tubes about the central strength member, the tubes may be wrapped with a water absorbing tape or other dry water absorbing material prior to the application of the sheath. Such a dry water absorbing material may also be used within the tubes.

In still further accord with the present invention, the individual tubes may be color coded or otherwise marked for identification. The tubes may be provided with a zip or line of weakness to thereby provide easy access to the interior of the tubes.

According further to the present invention, a filler material may be substituted for one or more of the tubes.

According still further to the present invention, the stranded core including the tubes encircling the central strength member may by encircled with a layer of strength yarn or other strength members prior to the sheath being extruded over the tubes. Armoring material may also be positioned between the tubes and the sheath.

The present invention provides a significant improvement over the prior art because an optical fiber cable having an increased optical fiber density is provided. The truncated isosceles triangular shape of the tubes have a larger cross-sectional area within the tubes for carrying optical fiber cables. Additionally, the shape of the tubes provides improved resistance to compression of the cable. Also, for a given number of optical fibers contained within the cable, the present invention provides an improved strain window as compared to prior art optical fiber cables. The improved strain window is provided by the fact that for a given cable diameter, the cable has a larger cross-sectional area for carrying optical fibers, i.e., the ratio of the cross-sectional area within the cable for carrying optical fiber to the cable outside diameter is larger than previously available in the art. This improved strain window is also provided by the fact that the size of the central strength member may remain the same while the outside diameter of the optical fiber cable is reduced as compared to the prior art for a given number of optical fibers within the optical fiber cable, e.g., the ratio of the central strength member diameter to the cable outside diameter is larger than previously available in the art.

The foregoing and other objects, features and advantages of the present invention will become more apparent in light of the following detailed description of exemplary embodiments thereof as illustrated in the accompanying drawings.

BRIEF DESCRIPTION OF THE DRAWINGS

FIG. 2 is a perspective view of a cable in accordance with the present invention having its cable jacket removed to show a parallel or straight stranding configuration of individual tubes;

FIG. 3 is a perspective view, partially broken away, of a cable in accordance with the present invention having its cable jacket removed to show a helical stranding configuration of individual tubes;

FIG. 4 is a perspective view of a cable in accordance with the present invention having its cable jacket removed to show an alternating hand helical (SZ) stranding configuration of individual tubes;

BEST MODE FOR CARRYING OUT THE INVENTION

Figure 1:
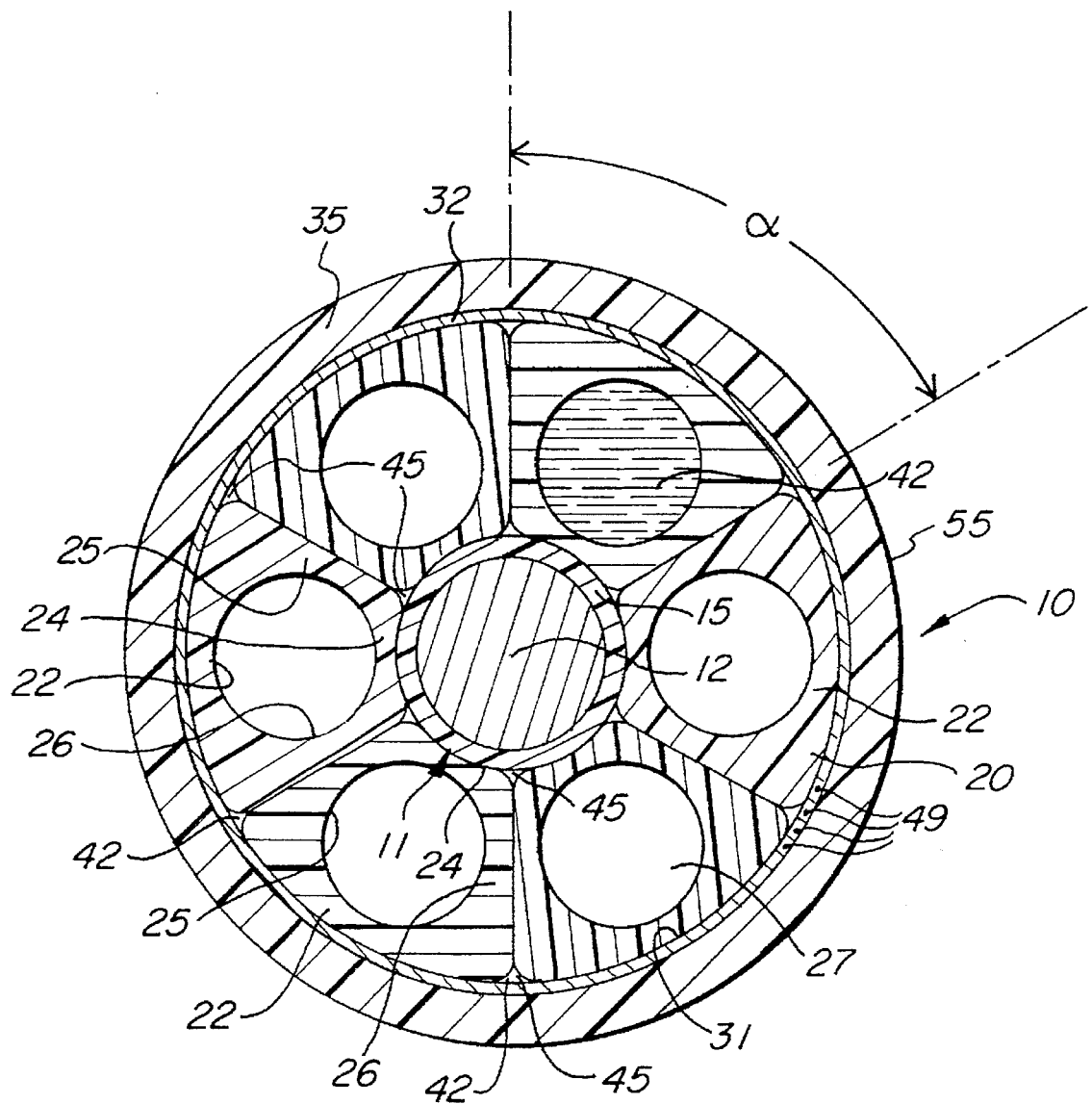
FIG. 1 is a cross-sectional view of an optical fiber cable in accordance with the present invention.

Referring to FIG. 1, an optical fiber cable 10 in accordance with the present invention comprises a centrally located strength member 11, which provides axial compressive and axial tensile strength. The strength member 11 should be high strength and resistant to compression in the axial direction. The strength member 11 includes a core 12 which may be made, for example, of a solid steel cable or a stranded steel wire or cable, or other suitably strong material such as glass fiber, polymer fiber, graphite, etc.

The strength member 11 may be coated with a jacket 15, which completely encloses the core 12. The jacket 15 may be made of plastic or other suitable material for coating the core 12. As is known in the art, the jacket 15 may be extruded over the core 12, or other suitable processes may be provided for coating the core 12 with the jacket 15.

Stranded about the strength member 11 are a plurality of tubes 20 of the invention. Each tube 20 has a generally frustum or truncated triangular shape with the base of the triangle (frustum) 22 having a curved shape which corresponds to an outside diameter of the tubes 20 stranded about the strength member 11, and a top or truncated end 24 of the tube 20 which is opposite and generally parallel the base 22. The truncated end 24 has a curvature which corresponds to the outside diameter of the central strength member 11. Connecting the base 22 and truncated end 24 of each tube 20 are side walls 25, 26. The side walls 25, 26 are of equal length and are disposed at an angle α with respect to each other. In the example of FIG. 1, there are six tubes 20 within the cable 10 and therefore the angle α between the side walls 25,26 is 60°. However, as will be understood by those skilled in the art, any number of tubes 20 may be used within the cable 10 as desired. For a given number (N) of tubes 20 within a cable, the angle, α, between the tube side walls 25, 26, may be determined in accordance with the following relationship:

$$\alpha = 360°/N \qquad \text{(equation 1)}$$

In the embodiment of FIG. 1, the tubes 20 have a central passage or aperture 27 of circular cross-section. These passages 27 are configured to receive a plurality of individually stranded optical fibers or one or more optical fiber ribbons. As is known in the art, when an optical fiber or optical fiber ribbon is received within a tube 20, it is often desirable to provide the optical fiber with an excess length such that the length of the optical fiber or optical fiber ribbon is longer than the length of the tube to thereby minimize the stress and strain on the optical fiber in response to bends in the optical fiber cable.

Surrounding the layer of tubes 20 is a layer of binder material 31 (FIGS. 1 and 2). The binder material 31 comprises a layer of material which holds the tubes 20 against the central strength member 11. The binder material 31 may be a layer of yarn, a plastic film, or any other suitable material having sufficient strength to hold the tubes 20 against the central strength member 11 while not adding significantly to the overall outside diameter of the cable 10. Surrounding the layer of binder material 31 is a layer of strength material 32. For example, a layer of strength yarn or aramid fibers 32 may be wrapped around the tubes 20 to thereby provide strength for the optical fiber cable. The strength material 32 also serves the purpose of securely holding the tubes 20 against the strength member 11. Surrounding the core, which comprises the strength member 11, tubes 20, binder material 31 and strength material 32, is a jacket or sheath 35. The jacket 35 may also be made of a plastic material which is extruded over the core of the optical fiber cable 10.

As illustrated in FIG. 1, the sides walls 25, 26 of the truncated triangular tubes 20 abut each other within the optical fiber cable to thereby provide support to each other. This tube design increases the mutual tube support areas between the tubes and improves the resistance of the cable 10 to compressive forces. Additionally, by using the truncated triangular design of the invention, the interstice areas or spaces 45 between the tubes 20 is decreased as compared to prior art cable designs.

The tubes 20 may be stranded about the strength member 11 using any known stranding technique. For example, the tubes 20 may be stranded parallel to the strength member 11 as shown in FIG. 2. Alternatively, the tubes 20 may surround the strength member 11 in a helical or alternating helical (SZ) pattern. Referring to FIG. 3, the tubes 20 are shown stranded about the strength member 11 in a helical design. In FIG. 4, the tubes 20 are shown stranded about the strength member 11 in a alternating hand helical (SZ) stranding.

To allow the tubes 20 to be easily distinguished from one another, the tubes may be uniquely identified 40 (FIG. 4) by applying a color coating, or other markings on the exterior surface of the tubes. Additionally, to provide for the prevention of water traveling along the length of the optical fiber cable 10, water blocking material 42 (FIG. 1) may be received in the tubes 20. For example, a thixotropic gel 42 may in inserted within the tubes 20 and in the interstice spaces 45 between the tubes 20 and between the tubes 20 and the strength member 11 and between the tubes 20 and the jacket 35 and strength material 32. Alternatively, a water blocking tape 47 (FIG. 3) may be positioned within the optical fiber cable 10. For example, the strength member 11 may be wrapped with the water blocking tape 47 (FIG. 3). Additionally, the water blocking tape 47 may be positioned either between the tubes 20 and the strength material 32 or between the strength material 32 and the jacket 35. Alternatively, the water blocking material 50 (FIG. 4) may be mixed in the strength material 32 or the strength material 32 may be disbursed with water absorbing yarns or other water absorbing material.

As described above, the inside of the tubes 20 may be filled with a thixotropic gel 42 (FIG. 1) to prevent the ingress of water. Alternatively, the optical fibers received in the tubes 20 may be coated or mixed with a dry water blocking material, such as a water blocking tape or resin, to prevent the ingress of water.

Figure 5:
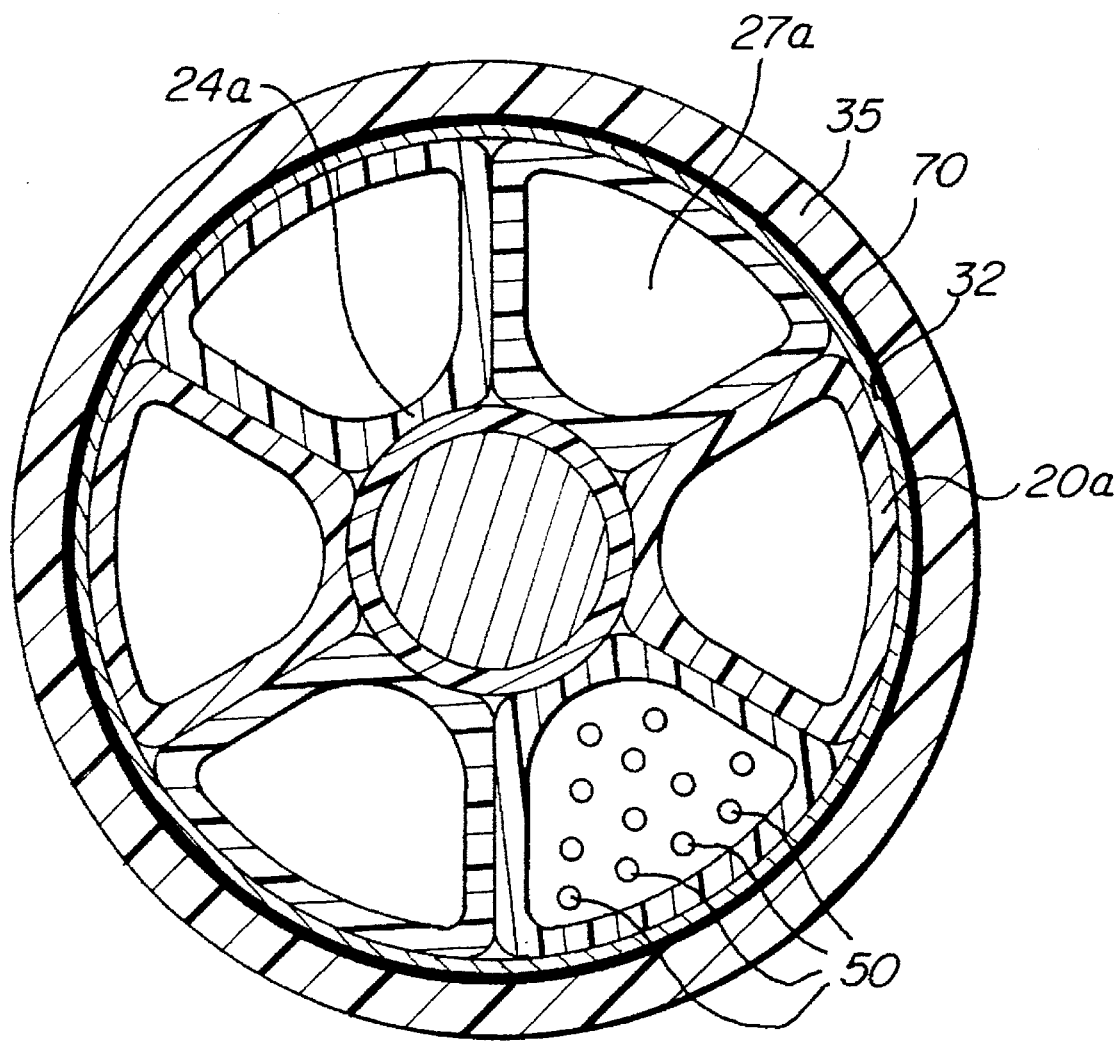
FIG. 5 is a cross-sectional view of a second embodiment of the invention.
Figure 6:
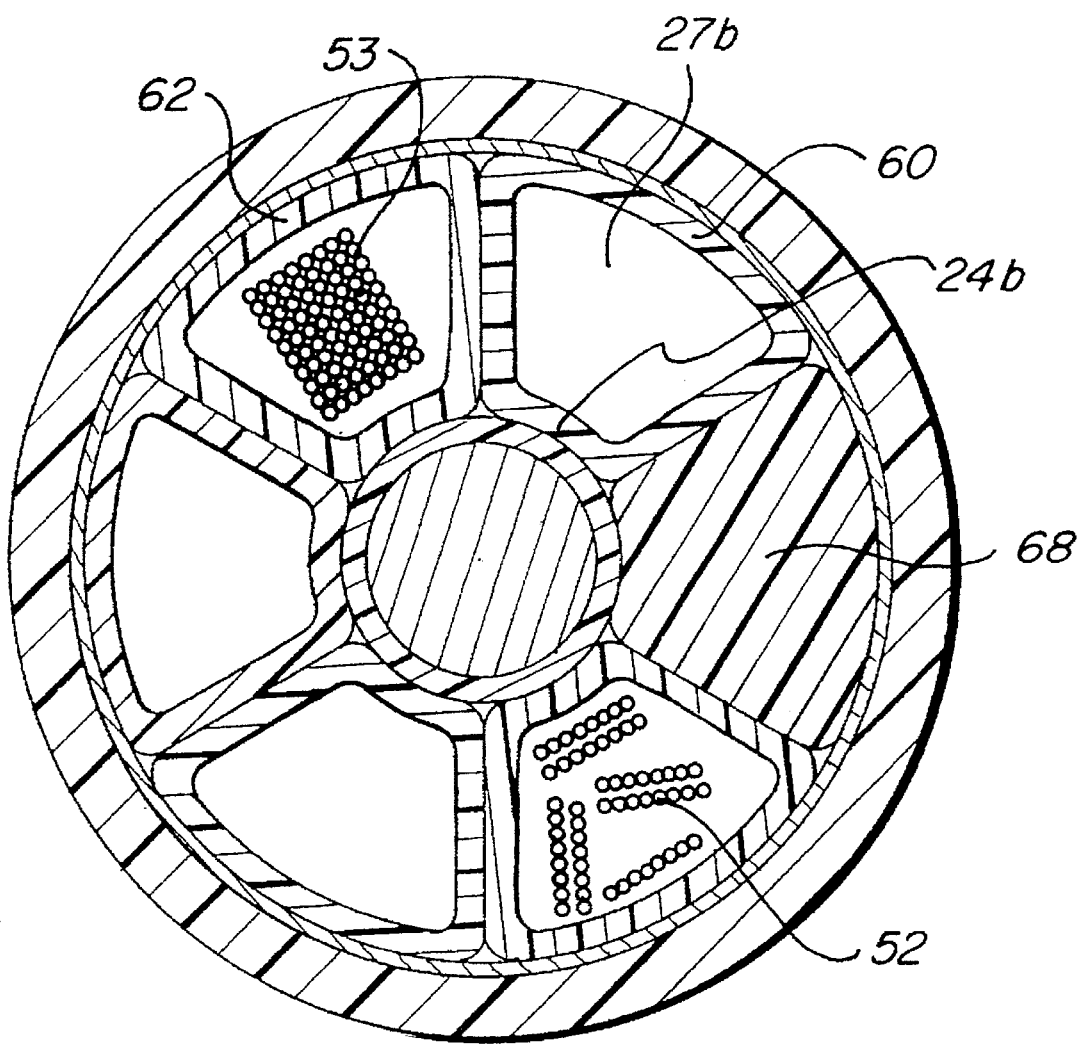
FIG. 6 is a cross-sectional view of a third embodiment of the invention.

Referring to FIGS. 5 and 6, second and third embodiments of the invention are shown having different shapes of the passages 27a, 27b within the tubes 20a, 20b, respectively. In both the examples of FIGS. 5 and 6, the shape of the passages 27a, 27b generally corresponds to the exterior shape of the tube 20a, 20b. However, in the second example of FIG. 5, the area of the passage 27a adjacent to the truncated top 24a of the triangle is rounded or smooth in shape whereas in the example of FIG. 6, the area of the passage 27b adjacent to the truncated top 24b of the triangle corresponds exactly to the shape of the truncated top. It is believed that these configurations provide tubes 20a, 20b which have superior resistance to compression while providing a large cross-sectional area for receiving individual optical fibers 50 (FIG. 5), randomly placed optical fiber ribbons 52 (FIG. 6), or a stack of optical fiber ribbons 53 (FIG. 6), thereby providing a cable which has increased optical fiber density as compared to the prior art.

As described above, the optical fibers 50 (FIG. 5) or optical fiber ribbons 52, 53 (FIG. 6) are described as being received loosely within the tubes 20 and having an excess length with respect to the tubes 20. However, the length of the optical fibers 50 (FIG. 5) and optical fiber ribbons 52, 53 (FIG. 5) may be the same or less than the length of the tubes 20, if desired.

A cable made in accordance with the present invention provides smaller cable dimensions and therefore less material is required to be used within the cable. Additionally, because the tubes 20 abut each other within the mutually supporting cable structure, less filling, flooding or other water blocking absorbing material is required to be used between the tubes. Because of the superior strength characteristics of the tube design, it is anticipated that less expensive polymers may be used to form the tubes because of the increased compressive resistance of the tubes. Because of the larger fiber space within the individual tubes, longer tube laylengths may be used, thereby providing a fiber cost savings.

In addition to the increased compressive resistance of the cable 10 made in accordance with the present invention, the cable 10 also provides an improved strain window. The improved strain window is provided by the fact that for a given cable diameter 55, the cable has a larger cross-sectional area for carrying optical fibers, i.e., the ratio of the cross-sectional area within the cable for carrying optical fiber to the cable outside diameter 55 is larger than previously available in the art. The improved strain window is also provided by the fact that the size of the central strength member 11 may remain the same while the outside diameter 55 (FIG. 1) of the optical fiber cable is reduced as compared to the prior art for a given number of optical fibers within the optical fiber cable, e.g., the ratio of the central strength member diameter 11 to the cable outside diameter 15 is larger than previously available in the art. Another advantage of the invention is that for a given number of optical fibers, the outside diameter of the cable being smaller provides for ease and installation. Additionally, the tubes of the present invention provide for easy identification, as described above, by providing various identification colorations or markings 40 (FIG. 4) on the individual tubes 20. As illustrated in FIG. 6, the tubes 20 may be provided with an area of reduced thickness 60 or a rip cord 62 or other similar type method for allowing easy access to the interior of the tubes 20.

Referring to FIGS. 2 and 5, to provide improved damage resistance, the cable of the invention may be provided with a layer of armor material 70 positioned between the layer of strength material 32 and the cable jacket (sheath) 35. The armor may include a longitudinally-applied corrugated or noncorrugated helically wrapped steel armor applied over the strength material 32. Other suitable high strength, damage resistant metallic, polymer and/or fiber armor material may also be used, such as aluminum, aramid sheets or strands, etc. The armor 70 may be flooded with a water blockable flooding compound such as a hot melt adhesive or a petroleum based flooding compound, as described hereinabove. The armor 70 is then encapsulated by the cable jacket 35.

The invention is described as containing a plurality of tubes 20 each having a passage or channel 27 for carrying optical fibers 50 (FIG. 5) or optical fiber ribbons 52, 53. However, as illustrated in FIG. 6, one or more of the tubes 20 may be replaced with a filler material 68 if desired. The filler material 68 may be a solid rod made from the same or similar material as the tubes 20. Alternatively, the filler material 68 may be made up of any other suitable material to fill the area within the cable 10 corresponding to one or more of the tubes 20. The material for the filler material 68 should be selected to provide structural support for the cable and to prevent compression of the cable.

Although the present invention has been described and illustrated with respect to exemplary embodiments thereof, the foregoing the various other additions and deletions may be made therein and thereto without departing from the spirit and scope of the present invention.

What is claimed is:

1. An optical fiber cable, comprising:

a central member;

a plurality of tubes surrounding said central member, each one of said plurality of tubes having a generally truncated isosceles triangular shaped profile, each one of said plurality of tubes including:

a base of the triangular shaped profile having a curvature corresponding to an inside surface of said sheath;

a top of the triangular shaped profile opposite and generally parallel to said base, said top having a curvature corresponding to an outside diameter of said central member;

a pair of side walls interconnecting said base and said top; and a central passage within said tube, wherein said base, top and side walls cooperate to form said central passage; and a sheath encircling said plurality of tubes and said central member.

2. An optical fiber cable according to claim 1, wherein said plurality of tubes are positioned adjacent to one another in a pie shape and wherein adjacent tops of said plurality of tubes form a central channel within the cable for said central member.

3. An optical fiber cable according to claim 2, further comprising one or more individual optical fibers received in said central passage of each one of said tubes.

4. An optical fiber cable according to claim 3, further comprising water blocking means within said central passage of each one of said tubes.

5. An optical fiber cable according to claim 4, further comprising water blocking means within said sheath between said tubes and said sheath.

6. An optical fiber cable according to claim 2, further comprising one or more optical fiber ribbons received in said central passage of each one of said tubes.

7. An optical fiber cable according to claim 6, further comprising water blocking means within said central passage of each one of said tubes.

8. An optical fiber cable according to claim 7, further comprising water blocking means within said sheath between said tubes and said sheath.

9. An optical fiber cable according to claim 2, wherein said tubes run parallel to said central member.

10. An optical fiber cable according to claim 2, wherein said tubes are stranded about said central member.

11. An optical fiber cable according to claim 2, further comprising coding means provided on each one of said tube for allowing identification of said tubes.

12. An optical fiber cable according to claim 2, wherein said central member includes a core and a jacket.

13. An optical fiber cable according to claim 2, further comprising strength means positioned between said tubes and said sheath.

14. An optical fiber cable according to claim 13, wherein said strength means includes strength fibers wrapped around said tubes.

15. An optical fiber cable according to claim 14, further including water absorbing material mixed with said strength fibers.

16. An optical fiber cable according to claim 13, further comprising binder material positioned between said tubes and said strength means.

17. An optical fiber cable according to claim 13, further comprising armoring means positioned between said strength means and said sheath.

18. An optical fiber cable according to claim 1, further comprising at least one filler means, said filler means having a generally truncated isosceles triangular shaped profile corresponding to the profile of said tubes, said tubes and said filler means being positioned adjacent to one another in a pie shape and wherein adjacent tops of said plurality of tubes and said filler means form a central channel within the cable for said central member.

* * * * *

UNITED STATES PATENT AND TRADEMARK OFFICE
CERTIFICATE OF CORRECTION

PATENT NO. : 5,649,043
DATED : July 15, 1997
INVENTOR(S) : Adams et al.

It is certified that error appears in the above-identified patent and that said Letters Patent is hereby corrected as shown below:

Column 8, line 6 (claim 11) "provided on each one of said tube" should read --provided on each one of said tubes--

Signed and Sealed this

Sixteenth Day of September, 1997

Attest:

BRUCE LEHMAN

Attesting Officer

Commissioner of Patents and Trademarks